US011430340B2

(12) United States Patent
Stayton et al.

(10) Patent No.: US 11,430,340 B2
(45) Date of Patent: *Aug. 30, 2022

(54) SYSTEMS AND METHODS FOR PROVIDING AIRBORNE AIRCRAFT WEATHER REPORTING AND SUPPLEMENTAL OCCUPANT SERVICES

(75) Inventors: Gregory T. Stayton, Peoria, AZ (US); James P. Redmond, Glendale, AZ (US)

(73) Assignee: AVIATION COMMUNICATION & SURVEILLANCE SYSTEMS LLC, Phoenix, AZ (US)

(*) Notice: Subject to any disclaimer, the term of this patent is extended or adjusted under 35 U.S.C. 154(b) by 95 days.

This patent is subject to a terminal disclaimer.

(21) Appl. No.: 12/748,351

(22) Filed: Mar. 26, 2010

(65) Prior Publication Data
US 2010/0311354 A1    Dec. 9, 2010

Related U.S. Application Data

(63) Continuation-in-part of application No. 12/467,997, filed on May 18, 2009, now Pat. No. 8,344,936, and
(Continued)

(51) Int. Cl.
*G08G 5/00* (2006.01)
*H04L 5/02* (2006.01)
(Continued)

(52) U.S. Cl.
CPC ....... *G08G 5/0008* (2013.01); *H04B 7/18506* (2013.01); *H04L 5/02* (2013.01);
(Continued)

(58) Field of Classification Search
CPC ..... G08G 5/0008–5/0013; G01S 13/91; G01S 13/9303; G01S 13/765–13/767;
(Continued)

(56) References Cited

U.S. PATENT DOCUMENTS 3,890,614 A * 6/1975 Argentieri .............. G01C 23/00
  342/177
5,636,123 A * 6/1997 Rich et al. .................... 701/301
(Continued)

OTHER PUBLICATIONS

International Search Report, issued by the International Searching Authority dated Nov. 20, 2014 for related PCT Application No. PCT/US2014/046563.
(Continued)

*Primary Examiner* — Matthew M Barker
(74) *Attorney, Agent, or Firm* — Dickinson Wright PLLC

(57) ABSTRACT

An embodiment of the present invention delineates a method for relaying information between a first transceiver and a second provided transceiver. The method comprises generating a signal for transmission from the first transceiver to the second provided transceiver. The method also modulates the signal with a first data pattern, the first data pattern comprising aircraft state data. The method also modulates the signal with a second data pattern, the second data pattern comprising information other than aircraft state data. The method also transmits the signal including both the first data pattern and the second data pattern from the first transceiver to the second provided transceiver. Other related system and method embodiments are set forth.

6 Claims, 13 Drawing Sheets

Related U.S. Application Data a continuation-in-part of application No. 12/150,248, filed on Apr. 17, 2008, now Pat. No. 9,791,562, application No. 12/748,351, which is a continuation-in-part of application No. 12/482,431, filed on Jun. 10, 2009, now Pat. No. 8,031,105.

(60) Provisional application No. 61/163,747, filed on Mar. 26, 2009, provisional application No. 61/054,029, filed on May 16, 2008, provisional application No. 60/926,126, filed on Apr. 24, 2007, provisional application No. 60/931,274, filed on May 21, 2007.

(51) Int. Cl.

| | | |
|---|---|---|
| *H04L 27/18* | (2006.01) | |
| *H04L 27/32* | (2006.01) | |
| *H04L 25/49* | (2006.01) | |
| *H04L 27/02* | (2006.01) | |
| *H04L 27/26* | (2006.01) | |
| *H04L 27/34* | (2006.01) | |
| *H04L 27/10* | (2006.01) | |
| *H04B 7/185* | (2006.01) | |
| *G01S 13/91* | (2006.01) | |
| *G01S 13/933* | (2020.01) | |

(52) U.S. Cl.
CPC .......... *H04L 25/4902* (2013.01); *H04L 27/02* (2013.01); *H04L 27/10* (2013.01); *H04L 27/18* (2013.01); *H04L 27/26* (2013.01); *H04L 27/32* (2013.01); *H04L 27/3488* (2013.01); *G01S 13/91* (2013.01); *G01S 13/933* (2020.01)

(58) Field of Classification Search
CPC ....... G01S 13/953; G01S 13/933; H04L 5/02; H04L 25/4902; H04L 27/02; H04L 27/3488; H04L 27/18; H04L 27/26; H04L 27/32; H04L 27/10
USPC .............................................. 342/30, 32, 37
See application file for complete search history.

(56) References Cited

U.S. PATENT DOCUMENTS

| | | |
|---|---|---|
| 5,691,723 A | 11/1997 | King et al. |
| 6,584,384 B2 | 6/2003 | Gremmert et al. |
| 6,603,819 B1 | 8/2003 | Myers |
| 6,748,030 B2 | 6/2004 | Myers |
| 7,082,171 B1 * | 7/2006 | Johnson et al. .............. 375/316 |
| 7,215,713 B2 | 5/2007 | Walker et al. |
| 7,308,046 B1 | 12/2007 | Studenberg |
| 7,373,223 B2 | 5/2008 | Murphy |
| 7,414,567 B2 | 8/2008 | Zhang et al. |
| 7,633,428 B1 * | 12/2009 | McCusker et al. ......... 342/26 B |
| 8,629,787 B1 | 1/2014 | Rathinam |
| 9,142,133 B2 | 9/2015 | Palanisamy |
| 2008/0032644 A1 | 2/2008 | Hunter |
| 2008/0035784 A1 * | 2/2008 | Meserole ............ G08G 5/0008 244/3.1 |
| 2008/0103647 A1 | 5/2008 | Fabrice et al. |
| 2008/0195263 A1 * | 8/2008 | Shehi ..................... G01C 5/005 701/4 |
| 2008/0243316 A1 * | 10/2008 | Sacle ....................... G01C 5/06 701/9 |
| 2010/0079329 A1 | 4/2010 | Stayton |
| 2010/0328143 A1 * | 12/2010 | Kirk ....................... G01W 1/04 342/26 B |
| 2011/0282582 A1 | 11/2011 | Stayton |
| 2012/0245835 A1 | 9/2012 | Weitz |
| 2013/0231852 A1 | 9/2013 | Weitz |
| 2014/0249701 A1 | 9/2014 | Latsu-Dake |

OTHER PUBLICATIONS

Federal Aviation Administration, "Advanced Interval Management (Focus: RIGA Special Committee 214 Tasking) Preliminary Concept of Operations," Mar. 27, 2014.

* cited by examiner

Gray Code Data Encoding

| BIT 1 | BIT 2 | BIT 3 | Phase Shift State |
|---|---|---|---|
| 0 | 0 | 0 | 0 |
| 0 | 0 | 1 | $\pi/4$ |
| 0 | 1 | 1 | $2\pi/4$ |
| 0 | 1 | 0 | $3\pi/4$ |
| 1 | 1 | 0 | $4\pi/4$ |
| 1 | 1 | 1 | $5\pi/4$ |
| 1 | 0 | 1 | $6\pi/4$ |
| 1 | 0 | 0 | $7\pi/4$ |

SYSTEMS AND METHODS FOR PROVIDING AIRBORNE AIRCRAFT WEATHER REPORTING AND SUPPLEMENTAL OCCUPANT SERVICES

CROSS REFERENCE TO RELATED APPLICATIONS

This nonprovisional utility application claims priority to U.S. Provisional Patent Application No. 61/163,747, filed Mar. 26, 2009 and titled "Systems and Methods for Aircraft Airborne Weather Reporting" and is a continuation-in-part of and claims full benefit of and priority to U.S. patent application Ser. No. 12/467,997, filed May 18, 2009 and titled "Systems and Methods for Providing an Advanced ATC Data Link," now issued as U.S. Pat. No. 8,344,936 on Jan. 1, 2013, which claims priority to U.S. Provisional Patent Application No. 61/054,029, filed May 16, 2008 and titled "Advanced ATC Data Link" and is a continuation-in-part of and claims full benefit of and priority to U.S. patent application Ser. No. 12/105,248, filed Apr. 17, 2008 and titled "Systems and Methods of Providing an ATC Overlay Data Link," which claims full benefit of and priority to U.S. Provisional Patent Application No. 60/926,126, filed Apr. 24, 2007 and titled "Systems and Methods of Providing an ATC Overlay Data Link" and to U.S. Provisional Patent Application No. 60/931,274, filed May 21, 2007 and titled "Systems and Methods of Providing an ATC Overlay Data Link," and is a continuation-in-part of and claims full benefit of and priority to U.S. utility patent application Ser. No. 12/482,431, filed Jun. 10, 2009, and titled, "Systems And Methods For Enhanced ATC Overlay Modulation," now issued as U.S. Pat. No. 8,031,105 on Oct. 4, 2011, the foregoing disclosures of which are fully incorporated herein by reference for all purposes.

FIELD OF THE INVENTION

The present invention relates to systems and methods for encoding and modulating digital information, and more particularly, to systems and methods for establishing an alternative data link through multiple modulation of electronic signals.

BACKGROUND OF THE INVENTION

Travel by aircraft is generally a safe and efficient way for travelers to reach remote destinations. Over the years, as the popularity of air travel has dramatically increased, the need for techniques for safely managing the flow of aircraft has also risen. To address air traffic safety issues, aircraft have been equipped with avionics equipment such as transponders that assist air traffic controllers in identifying, tracking, and managing aircraft in flight.

Through radio frequency transmissions, transponders provide air traffic controllers and other suitably equipped aircraft with information such as aircraft identification, altitude, and other aircraft-specific data. Ready access to such information allows controllers and pilots to utilize airspace in a safer and more efficient manner. As the density of air traffic grows, it is understandable that there is a growing need for more information to be relayed between aircraft and ground stations on a near-real-time basis.

Currently, FAA Air Traffic Control and most other ATC controlling authorities around the world use standard modulation schemes to ensure interoperability of their radio frequency signals with other aircraft and systems. For example, the Minimum Operational Performance Standards for Air Traffic Control Radar Beacon System/Mode Select (ATCRBS/Mode S) Airborne equipment, promulgated by RCTA as RTCA/DO-181C (and incorporated by reference herein in its entirety) defines pulse position modulation on 1090 MHz for Mode S transponder and older transponder (ATCRBS transponders) replies to 1030 MHz ground station and TCAS interrogations. By using standard protocols aircraft state information as well as other data can be relayed aircraft to ground, ground to aircraft, or in some instances aircraft to aircraft.

Automatic Dependent Surveillance Broadcast (ADS-B) represents one example of expansion of capability within spectrum and format restrictions of an existing standard. ADS-B messages such as Mode-S squitters may be identified by their header format, and while they utilize the same frequencies as legacy systems such as ATCRBS, they are designed not to interfere with existing equipment. Thus, ADS-B protocols allow for augmented communications capabilities provided the waveforms utilized are constrained to acceptable formats and performance characteristics. Incompatible legacy equipment may receive such enhanced signals, even if the information is extraneous to their operation, and the rejection of unrecognized symbols does not necessarily impede performance of legacy equipment.

The volume of information that must be transmitted from aircraft continues to increase as more advanced avionics and traffic control systems become available. Likewise, the need to transmit diverse information of all kinds also drives the desire to utilize aircraft systems to send data. However, because of the large number of required transponder replies in heavily traveled areas (such as in the vicinity of an airport, where hundreds of replies per second are generated), there are worldwide limits on the number of transponder broadcast transmissions permitted each second from each aircraft. For example, the limit for Automatic Dependent Surveillance Broadcast (ADS-B) is currently set to 6.2 transmissions per second to prevent the additional ADS-B interference from potentially all the aircraft near a major airport creating a situation where the ATC ground station becomes unable to receive surveillance replies from aircraft in the terminal area being controlled by ATC.

For example, the existing Mode S transponder reply data format (also known as squitters when they are sent unsolicited by an interrogation) is implemented with a pulse position modulation technique, where the position of a pulse determines whether a bit is a one or a zero. Referring to the transmission reply data format and timing diagram 200 in FIG. 2, the first four pulses 203 within the 8 microsecond preamble time 210 are called preamble pulses and are used to determine that the pulse position data that follows is for a Mode S reply (or squitter). ADS-B squitters use the long Mode S reply format and thus contain 112 bits in the data block 220 per squitter. In other applications, 56 bits may be transmitted.

Data is transmitted through digital data encoded in the Data Block 220. A bit interval 202 comprises two sub-intervals defining the logical state of a bit symbol. When a pulse is in the "1" sub-interval position (FIG. 3, 301) of a bit interval 202, that bit value is a 1 and when a pulse is in the "0" sub-interval position (FIG. 3, 302) of a bit interval 202, that bit value is a 0. Only one pulse either in a "0" or a "1" position is permitted for each bit interval or bit symbol period (such as bit interval 202) of the entire message shown 200.

Referring to FIG. 3, an expanded view of bit interval 202 is shown. A carrier wave in the form of a pulse waveform 310 is being transmitted in the "1" position 301, and no pulse is transmitted 315 during the "0" sub interval, and therefore, this bit interval represents the value of logical "1." Note that the sinusoidal waveform 310 provided in the drawing is for illustration purposes only, as a standard frequency for ADS-B replies is currently 1090 MHz+/−1 MHz, approximately 545 cycles of the waveform 310 would normally occur during the 0.5 microsecond sub-interval 301. The phase of the waveform 310 is also unimportant for existing transponder reply standards.

ADS-B squitter data content has already been defined for the most part by industry committees such as SC186, and there is little remaining room for future growth. In fact, systems currently envisioned and being developed by avionics systems designers will likely need to transmit more data than can be sent within the 6.2 squitters per second limit. The ability to employ more data in avionic systems is now and will continue to be needed. However, expansion into new spectrum or revision of existing standards may render obsolete billions of dollars of infrastructure and avionics equipment. What is needed are methods and systems to increase data throughput and provide for additional communication links without significant impact on existing ATC systems and spectrum. Such increased data throughput may be employed in any one of a number of different ways to improve aircraft operability and safety, as well as to provide supplemental services to aircraft passengers.

SUMMARY OF THE INVENTION

Embodiments of the present invention disclose systems and methods for providing an avionics overlay data link. Through embodiments of the present invention, existing ATC (or other) modulated signals using existing standard frequencies or other frequencies may be utilized to transmit (e.g., from an aircraft transponder) additional information in a manner that does not render the transmitted signal unrecognizable by legacy ATC equipment. Legacy equipment will be able to demodulate and decode information that was encoded in the transmitted signal in accordance with pre-existing standard modulation formats, and updated equipment can also extract the additional information that was overlaid on transmitted signals.

The overlay data may comprise any information desired to be transmitted, including but not limited to, navigation, communication, monitoring, aircraft management, flight control, collision avoidance, vectoring, terrain avoidance, protected area warnings, traffic management, satellite based air traffic management, FIS-B, ASDE-X, and additional or supplementary ATC information. Existing transponder and ground station frequencies may be utilized for the transmission, and the signals modulated with the overlay data may be received by any receiver, including but not limited to receivers in aircraft and ground stations. Signals may be transmitted air-to-air, air-to-ground, ground-to-air, space-to-ground, ground-to-space or combination thereof. The modulation protocols or types utilized in both in the primary avionics signal and the overlaid signal are selectable from any suitable modulation schemes, but those of skill in the art appreciate that modulation protocols utilized in various embodiments of the invention may be selected to be a non-varying modulation, including, but not limited to fixed modulation protocols. As used herein, the term "overlay modulation" includes modulating a signal that has previously been modulated, including chases where a single or a plurality of modulations were previously applied to the signal.

Embodiments provide a method for encoding an overlaid message onto a provided modulated avionics signal, such as an ATC signal the method comprising selecting an overlay modulation protocol; and modulating the provided modulated ATC signal with an overlay message using the selected overlay modulation protocol. The provided modulated ATC signal may be modulated with any protocol such as a pulse position modulation protocol, and the overlay modulation protocol may be any protocol such as phase shift keying modulation. When phase shift keying modulation is utilized, phase states may be assigned using Gray Code to further reduce bit error. In one embodiment, modulating the provided modulated ATC signal with an overlay message using the selected overlay modulation protocol further comprises applying the overlay modulation to one or more modulated message bit intervals within a data block in the modulated ATC signal. In various embodiments where the overlay modulation comprises a PSK modulation protocol, a phase transition in a carrier signal in a bit interval is modulated into the carrier, and such phase transition may occur at any location in the carrier signal in the bit interval. In one embodiment, such phase transition may occur in the carrier signal proximate to a mid-point of the bit interval, or proximate an initial point of the bit interval. A plurality of phase transitions may also be modulated into the carrier signal within any particular bit interval. The location of a phase transition within a bit interval may be selected to optimize spectral performance, noise performance, or any other criterion.

The ATC modulation protocol and the overlay modulation protocol may comprise any single or combination digital modulation scheme, including, but not by way of limitation any of the following modulation protocols: binary phase shift keying modulation (BPSK); quadrature phase shift keying modulation (QPSK); 8-phase shift keying modulation (8-PSK); differential phase-shift keying (DPSK); DNPSK modulation, where N is an even integer and a multiple of 2; frequency shift keying (FSK); amplitude shift keying (ASK); quadrature amplitude modulation (QAM); orthogonal frequency-division multiplexing (OFDM); minimum-shift keying (MSK); asymmetric phase-shift keying, (APSK); pulse position modulation (PPM); amplitude modulation (AM); frequency modulation (FM); or any other modulation form using amplitude, phase, or frequency signal characteristics and methods of use; and combinations of any of those protocols. Single or multiple modulation operations may be performed on the ATC signal to encode additional overlay information.

The signal to be modulated may be a standard ATC format as described above, or may comprise any number of signal types alone or in combination, such as a transponder reply signal; a squitter signal; surveillance radar, an ADS-B reply signal; a 1030 MHz interrogation signal; a 1030 MHz TCAS signal; a General Aviation UAT transceiver signal on a UHF frequency band; at least one of a signal within a voice band or a data band operating within an HF RLS, ATC HF, VHF, and UHF band, a VDL Mode 4 ADS-B modulated signal; DME; SATCOM; or any other avionics equipment that radiates a modulated RF signal; a baseband signal for transmitting data; and combinations of those signal types.

The overlay data may be encoded, encrypted, supplemented, interleaved, or otherwise processed before or after overlay modulation occurs. Such processing may be intended to reduce bit error rates by providing supplemental check bits, parity bits, CRC bits, Reed-Solomon bit error detection and correction coding or data, or other information to conduct error checking or error correction coding. Interleaving may be used to spread overlay data or data symbols across multiple bit intervals within a transponder reply or squitter message, or across multiple reply or squitter messages in order to reduce the effect of burst noise on the bit error rate of the transmitted message.

In one embodiment, a method for encoding an overlaid message onto a provided modulated avionics signal is disclosed. The method comprising: (1) selecting an overlay modulation protocol; and (2) modulating the provided modulated avionics signal with an overlay message using the selected overlay modulation protocol; wherein the waveform of the modulated avionics signal comprises any amplitude and spectral characteristic. In various embodiments, the rise time of the modulated avionics signal may comprise a rise time greater 100 nanoseconds, and in some embodiments, the rise time may be greater than 600 nanoseconds. The fall time of the modulated avionics signal may comprise a fall time greater 200 nanoseconds, and in some embodiments, the fall time may be greater than 600 nanoseconds. The preamble data of the modulated avionics signal may be a set of initial 8PSK data bits that are sent in a particular pattern. Consistent spacing between data bits in the modulated avionics signal may be achieved. The bit dwell time per symbol may be a desired modulation phase wherein there is no restriction on phase transition rate. The waveform of the modulated avionics signal can be offset near frequency tolerance edge. The amplitude of the waveform of the modulated avionics signal may also be a varied amplitude based on range to intended recipient. The provided modulated avionics signal may be modulated with pulse position modulation protocol; alternatively, the overlay modulation protocol may be implemented with phase shift keying modulation. A plurality of phase states for sequentially defined phases may be Gray-Code encoded.

Modulating the provided modulated avionics signal with an overlay message using the selected overlay modulation protocol may comprise applying the overlay modulation to a carrier signal within one or more modulated message bit intervals within a data block in the modulated avionics signal. The overlay modulation may include a PSK protocol; and a phase transition is modulated into the carrier signal proximate to a mid-point of the bit interval. Or, the overlay modulation may comprise a PSK protocol; and a phase transition is modulated into the carrier signal proximate an initial point of the bit interval. The overlay modulation may include a PSK protocol; and a plurality of phase transitions are modulated into the carrier signal within one bit interval. The method further comprising transmitting the overlay-modulated modulated avionics signal from at least one of a TCAS transponder; an ADS-B transponder; a ATC radar; and a ground station. The overlay modulation protocol is selected from the group consisting of: modulation by amplitude characteristics, modulation by phase characteristics, modulation by frequency characteristics, modulation by pulse duration characteristic and any combination thereof. The overlay message may be encrypted. Also, a second overlay modulation protocol to the overlay-modulated signal. The second overlay modulation protocol may be any of the previously mentioned protocols. Modulating the provided modulated avionics signal with an overlay message using the selected overlay modulation protocol further comprises interleaving the overlay message into message bit intervals. The modulated avionics signal may not conform to the criteria for waveforms established in RTCA standard DO-181C, Minimum Operational Performance Standards for Air Traffic Control Radar Beacon System/Mode Select (ATCRBS/Mode S) Airborne Equipment.

In another embodiment, a method for decoding an overlaid message from an overlay modulated signal is provided. The method includes demodulating the overlay modulated signal with a first modulation protocol to produce a first message; demodulating the overlay modulated signal with a second modulation protocol to produce an overlay message; wherein the first message and the overlay message may be independently demodulated from the overlay modulated signal.

The first or second modulation protocol may comprise any single or combination digital modulation scheme, including, but not by way of limitation any of the following modulation protocols: binary phase shift keying modulation (BPSK); quadrature phase shift keying modulation (QPSK); 8-phase shift keying modulation (8-PSK); differential phase-shift keying (DPSK); DNPSK modulation, where N is an even integer and a multiple of 2; frequency shift keying (FSK); amplitude shift keying (ASK); quadrature amplitude modulation (QAM); orthogonal frequency-division multiplexing (OFDM); minimum-shift keying (MSK); asymmetric phase-shift keying, (APSK); pulse position modulation (PPM); amplitude modulation (AM); frequency modulation (FM); or any other modulation form using amplitude, phase, or frequency signal characteristics and methods of use; and combinations of any of those protocols.

Embodiments of the present invention provide that the received overlay data may be decoded, decrypted, supplemented, de-interleaved, or otherwise processed after receipt. Such processing may be intended to reduce bit error rates by providing supplemental check bits, parity bits, CRC bits, Reed-Solomon bit error detection and correction, or other information to conduct error checking or error correction coding. De-interleaving may be used to extract overlay data from multiple bit intervals within a transponder reply or squitter message, or across multiple reply or squitter messages in order to reduce the effect of burst noise on the bit error rate of the transmitted message. Further, additional demodulations may occur to extract additional overlaid data from the received signal. These additional demodulations may use any modulation protocol as defined herein.

When the overlay modulation is phase shift keying-type (PSK) modulation, recovery of encoded data phases may be complicated by fluctuations or drift in the phase of the carrier frequency. Normally, with ATCRBS or ADS-B type replies, the phase of the carrier does not matter as long as the pulse position is correctly modulated. To obtain an accurate data phase and reduce bit errors of the PSK, embodiments of the present invention compensate for the phase drift whether synchronous or differential PSK techniques are utilized. In one embodiment, the second modulation protocol comprises phase shift keying; and a phase error is subtracted from a signal phase to produce a data phase. The phase error may be computed by identifying one or more preamble pulses within the overlay modulated signal; identifying one or more data pulses within the overlay modulated signal; determining one or more phases of a carrier frequency within at least one of the one or more preamble pulses and the one or more data pulses; and comparing the one or more phases of the carrier frequency to a predetermined frequency to compute a phase error. In the case of a differential PSK modulation, embodiments of the present invention provide that the second modulation protocol comprises differential phase shift keying; and a first phase of a first carrier wave pulse within a first bit interval is computed by comparing the first phase of the first carrier wave pulse within the first bit interval to a second phase of a second carrier wave pulse within a second bit interval.

Embodiments of the present invention may utilize any system or method disclosed herein, or in any related application, to increase data throughput. Such increased data throughput may be employed in any one of a number of different ways to improve aircraft operability and safety, such as providing data concerning weather conditions, as well as to provide supplemental services to aircraft passengers. Such supplemental services may, for example, include providing access to: (1) a network, such as the Internet, (2) a communication system, such as a telephonic communication system, a text-based communication system or a video-based communication system, (3) entertainment content, such as music, a movie, a game or any other entertainment content whether such content be provided in an audio format, a visual format or a combination thereof and (4) an offer to sell a product or a service.

In another exemplary embodiment of the present invention, a method is disclosed for relaying information between a first transceiver and a second provided transceiver, the method comprising generating a signal for transmission from the first transceiver to the second provided transceiver; modulating the signal with a first data pattern, the first data pattern comprising aircraft state data; modulating the signal with a second data pattern, the second data pattern comprising information other than aircraft state data; and transmitting the signal including both the first data pattern and the second data pattern from the first transceiver to the second provided transceiver.

In another exemplary embodiment of the present invention, a system is disclosed, comprising a first transceiver for generating a signal for transmission to a second provided transceiver; a first modulator for modulating the signal to include a first data pattern, the first data pattern comprising aircraft state data; and a second modulator for modulating the signal to include a second data pattern, the second data pattern comprising information other than aircraft state data, wherein the transmission of the signal includes both the first data pattern and the second data pattern.

The accompanying drawings, which are incorporated in and constitute a part of this specification, illustrate several embodiments of the invention and together with the description, serve to explain the principles of the invention.

DESCRIPTION OF THE EMBODIMENTS

Figure 2:
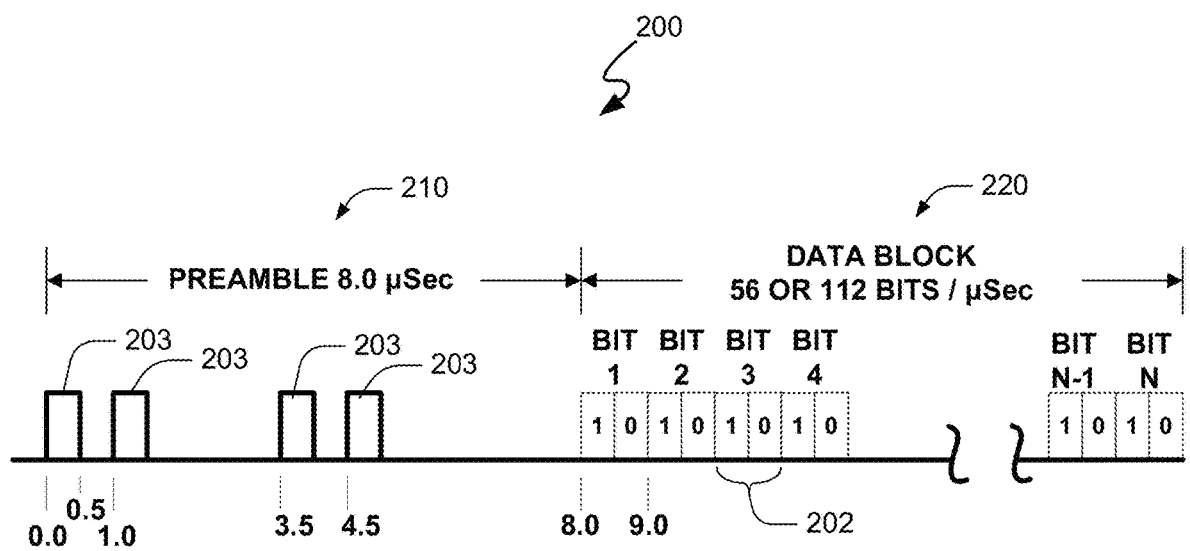
FIG. 2 illustrates a standard prior art transponder reply data format and timing diagram.
Figure 3:
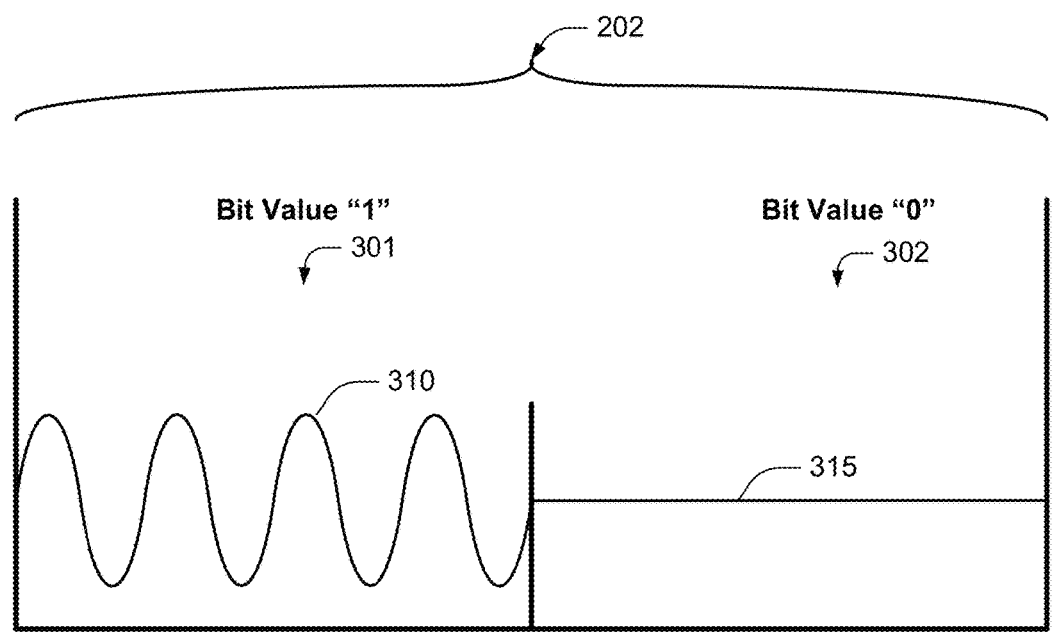
FIG. 3 depicts an expanded view of an exemplary bit interval of the reply data format, with a logical data value "1" pulse encoded.

Embodiments of the present invention provide methods for overlaying additional data on top of existing ATC or other data without adversely affecting existing ATC transponder/TCAS/Ground Station/Multilateration or other existing equipment. Embodiments of the present invention may use any form of modulation overlaid on top of existing ATC data, and depending on implementation, the overlaid data may be undetectable by equipment that processes legacy ATC signals. This permits the use of existing equipment within the ATC environment, and the use of new equipment that can be either backwards compatible and/or independent of ATC existing data formats permitting more data throughput efficiency using the same ATC bandwidth and frequency assignments of 1030 and 1090 MHz or alternative (nonstandard for legacy) bandwidths and alternative (nonstandard for legacy) frequency assignments. Embodiments of the present invention utilize a transponder reply data format and timing diagram similar to that shown in FIG. 2. However, as discussed in more depth below, embodiments of the present invention provide additional modulation within each pulse interval 202 that may not be detected by existing ATC equipment or methods, but can provide additional data bits within the same reply.

Figure 1:
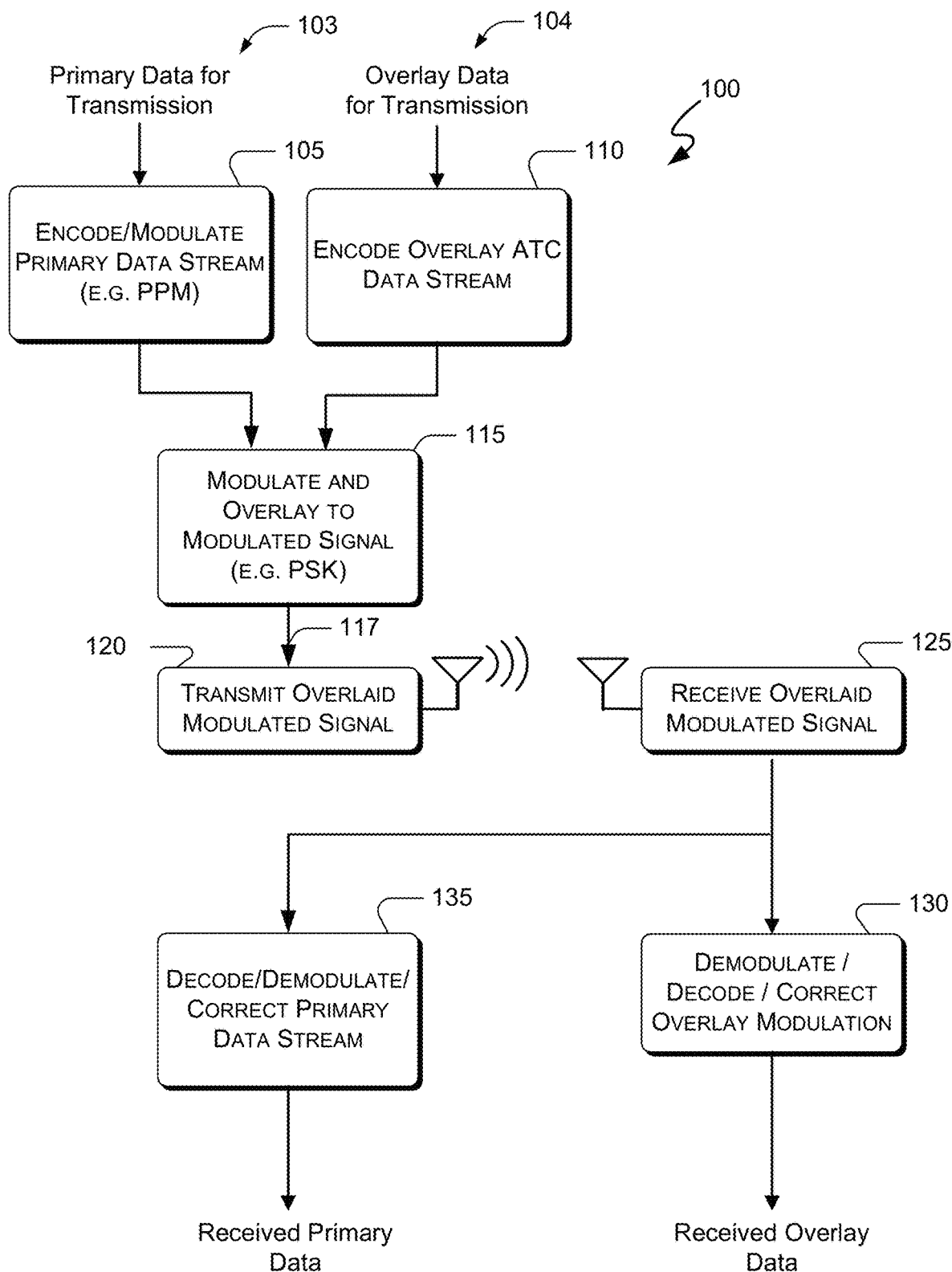
FIG. 1 illustrates a block diagram of an embodiment of a system of the present invention.

Turning to FIG. 1, a block diagram 100 illustrates an embodiment of a system of the present invention. In this embodiment the data stream is a primary ATC data stream but may be any suitable data stream. A primary ATC data stream 103 is input to an encoder and modulator 105 that produces a modulated signal (such as by pulse position modulation) that if desired may comply with existing standards such as an ADS-B squitter or reply transmissions (see, e.g., FIG. 2). Data 104 that is desired to be transmitted through an overlay data link is encoded 110, if desired, with information such as parity bits, CRC (cyclic redundancy check) codes, encryption keys, or any other information or encodings that are desired to be applied to the overlay data. The encoded overlay data is then further 115 modulated into the modulated ATC stream 115 in a manner that provides a reply/squitter signal that is compatible with existing hardware yet contains information in excess of that defined by current transponder standards. One exemplary method to achieve such overlay modulation compatibility is to initially modulate the ATC signal with a pulse position modulation that is acceptable by currently deployed hardware, and then apply the overlay modulation with a technique such as phase shift keying "PSK." PSK is a digital modulation scheme that conveys data by changing, or modulating, the phase of a reference signal (e.g., the carrier wave), as opposed to selectively applying a pulse to bit symbol times as is utilized in pulse position modulation. Since varying the phase of the carrier signal within each defined time frame in an ATC-encoded reply signal does not impact the ability of legacy hardware to decode the original ATC data message, the PSK modulation is nondestructive and may be independently demodulated. Put another way, the twice-modulated signal 117 carries the ATC data 103 that is modulated and directly decodable by conventional PPM techniques, in addition to additional data 104 that has been overlaid on the modulated signal in a non-destructive manner, such as by PSK modulation.

The modulated signal 117 may then be transmitted 120 and received by a receiver 125 that is configured to receive ATC transponder reply transmissions (such as a ground station or another transponder in a suitably equipped aircraft). In various embodiments, the transmitter 120 and the receiver 125 may comprise any electronic equipment capable of sending and/or receiving RF signals, including, but not limited to ATC radars, TCAS transponders, ADS-B transponders, and ground stations of any type. In one embodiment, ADS-B ground stations can receive and transmit ATC Overlay messages on top of various outputs such as Traffic Information Service Broadcasts (TIS-B, Automatic Dependent Surveillance Re Broadcasts (ADS-R).

The received signal is then demodulated 135 by PPM demodulation 135 to recover the original primary ATC data 103 after any necessary decoding. The received signal is also demodulated 130 to obtain the overlay data 104, which may be presented in several channels after any necessary decoding. Therefore, the twice-modulated signal 117 may be demodulated with multiple techniques independently and each data stream (103, 104) respectively independently recovered.

Any form of modulation may be overlaid on top of any ATC-modulated signals, whether such modulation currently exists or is created at a future date. In alternate embodiments, additional data may be overlaid by modulation on top of an overlaid modulation as well, and this modulation is not limited to modulation that is undetectable by existing equipment. Further, the modulation is not limited to 1090 MHz squitters and replies, but can also be used on 1030 MHz (currently interrogation by radars and TCAS), on the General Aviation UAT transceiver UHF frequency band, ATC HF, VHF and UHF voice and data bands, on the VDL Mode 4 ADS-B modulation used for ADS-B in limited locales within Europe, DME; SATCOM; or any other avionics equipment that radiates a modulated RF signal and at baseband for ATC terminal or other networks currently sending data over landline or microwave links. Thus any form of ATC modulation that is used can have an overlaid modulation applied to it at any frequency. This can also include, for example, overlaid modulation on a modulation applied to Air Transport airborne weather radar for communication links. Therefore, embodiments of the present invention provide that any overlay modulation type (whether interfering in some manner or not) may be overlaid on or added to or encrypted with any modulation type for whatever purpose desired, such as, but not limited to ATC applications, any commercial data relay purposes, low probability of intercept applications, low probability of detection techniques, low probability of spoofing purposes, and encryption.

Figure 4:
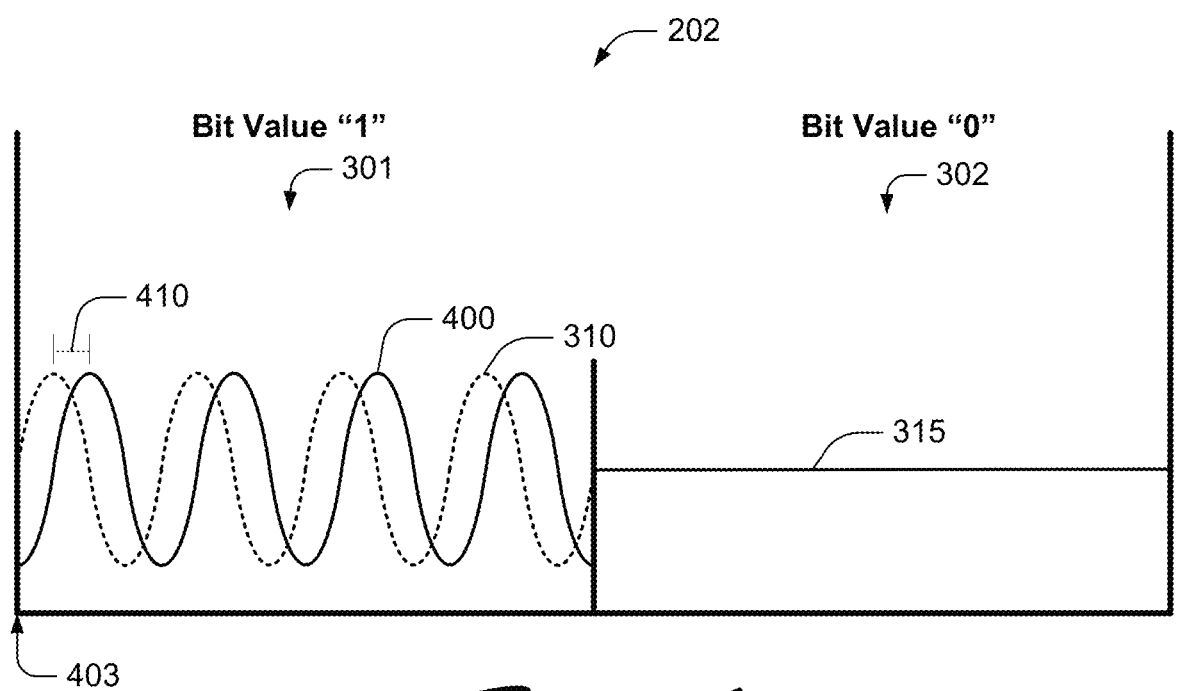
FIG. 4 shows one bit interval of modulated ATC signal with overlay data, where the carrier has been phase shifted ninety degrees, the phase shift occurring at or near the beginning of the bit interval.
Figure 5:
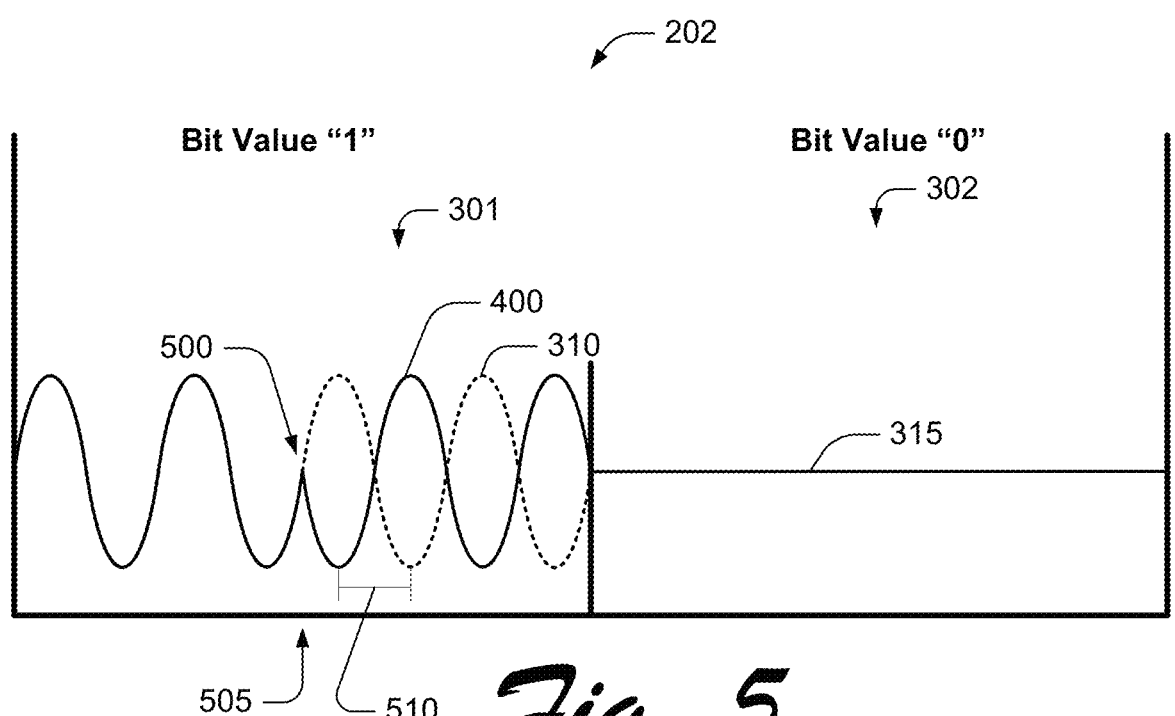
FIG. 5 shows one bit interval of modulated ATC signal with overlay data, where the carrier has been phase one hundred eighty degrees, the phase shift occurring approximately at the midpoint of a carrier within a sub-bit interval.

Embodiments of the present invention may employ phase shift keying (PSK) modulation within each of the 112 bit pulses in the data block 220. Turning to FIG. 4, an expanded view of one exemplary bit interval 202 of the data block 220 is shown, with an ATC data value of logical "1" (carrier pulse 400 is present in "1" sub-interval position, 301) and the phase shifted carrier signal 400 is overlaid with phase modulation by phase shift 410 of ninety degrees. The phase shift in this embodiment occurred at or near the beginning 403 of the logical "1" sub-interval position 301. The original unshifted carrier signal 310 is shown for comparison. Depending on the particular PSK implementation, this phase shift may correspond to one bit or several bits of overlay data. Note that the sinusoidal waveform 310 provided in the drawing is for illustration purposes only, and as a standard frequency for ADS-B replies is currently 1090 MHz+/-1 MHz, approximately 545 cycles of the waveform 310 would normally occur during the 0.5 microsecond sub-interval 301. As the applicable ATC standards do not care about the phase of the carrier wave, the presence of an acceptable frequency and amplitude waveform in the appropriate bit sub-interval position 301 is all that is needed to provide the logical "1" originally encoded.

Phase information can then be sent with a differential phase between each pulse representative of a plurality of states used to represent a plurality of bits. Each phase difference is detected by examining the phase of a previous pulse to the phase of the next pulse to eliminate the effects of relative aircraft motion. For the first phase reference pulse relative to Bit 1 case, any of the preamble pulses 203 may be used, and from then forward each previous bit pulse phase can be used as the reference for the next bit phase.

Other PSK methods can be used to send data such as a synchronous transmission of phase, where comparison to a reference that is synchronized in phase to the incoming reply signal modulation is used to determine a phase value for each pulse. The preamble pulses of the Mode S reply message can be used to synchronize a reference oscillator source to the incoming message RF signal using, for instance, a phase-locked-loop oscillator or a Costas loop that can be locked to the incoming signal phase and frequency, which is then used as a phase reference for all the data bits.

Figure 6:
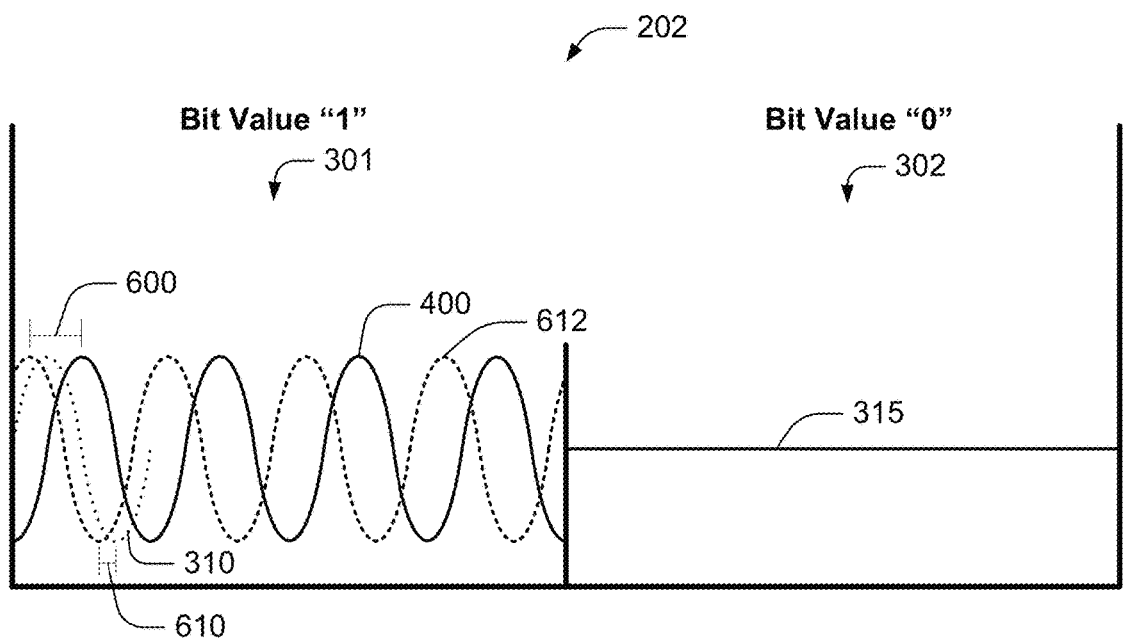
FIG. 6 shows one bit interval of modulated ATC signal with overlay data, where the carrier has been phase shifted ninety degrees, and frequency drift has affected the carrier.

In legacy ATC systems, the frequency of the signal being transmitted are in the range of 1090 MHz plus or minus 1 MHz, and drift of the phase of the carrier signal is generally not of concern provided the signal envelopes within predetermined timing intervals is within established ranges, such as those set forth in RTCA standard DO-181C. To recover a phase shift encoded within the broadcast carrier signal, embodiments of the invention provide for obtaining the data phase by synchronous or asynchronous means. Turning to FIG. 6, original carrier 310 (shown only partially for clarity) would have undergone a frequency drift 610, producing a new drifted-phase carrier 612. Without knowledge of the amount of drift 610, the exact phase of the phase-shifted carrier 400 may be difficult to determine. In one embodiment, phase drift 610 is accounted for via phase synchronous means but with the frequency asynchronous, for instance by utilizing an integrator and accumulating and storing the phase drift as a phase error signal that can be subtracted out from the phase of the current signal. In another illustrative embodiment, after a predetermined amount of data pulses are received (for instance 7 pulses), a local oscillator tracks the received signal via a Costas loop, allowing frequency and phase synchronization. The local oscillator is then driven with an offset frequency to maintain synchronization. Through this approach, interfering signals with different frequencies can be distinguished through use of a matched filter, and through use of matched filters with synchronized frequency and phase, noise performance can be improved significantly, for instance by about 3 dB.

Aircraft motion and signal-to-noise-ratio, as mentioned above, may be taken into account when determining an acceptable bit error rate (BER). For instance, if two aircraft, one transmitting a reply and the one receiving the reply are traveling towards one another at a rate of 1200 knots, which is 2000 ft. per second, the relative velocities can significantly affect the phase error seen by the receiving aircraft. Since the wavelength in free space is about 1 foot at ATC 1030 MHz and 1090 MHz frequencies, a phase error of about 2000 ft./sec.×360 degrees phase×112 usec ($112\times10^{-6}$ seconds per Mode S reply message length)=80 degrees phase error. Since the 80 degrees of error is spread over the entire Mode S message and each phase can either be differentially compared from the previous to the next bit or synchronized out as described above, the phase error between each bit then is about 80 degrees/112 bits per microsecond=0.71 degrees phase error per bit. Thus, any encoding scheme that can tolerate a phase error of 0.71 degrees between each bit is realizable, but is also affected by the signal to noise ratio to accurately measure phase. For a reasonable signal to noise ratio that exceeds 10 db, a PSK encoding scheme that provides 360 states or 1 degree per state could be tolerated. Usually a power of two is used for binary encoding, so 256 ($2^8$) states could be used to provide 8 bits of data per PPM pulse.

Figure 10:
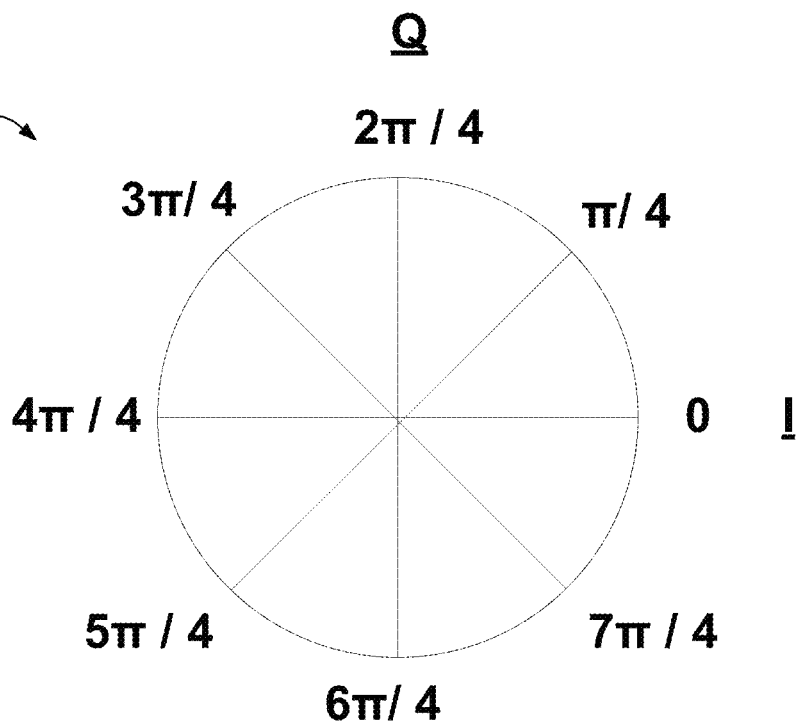
FIG. 10 shows a constellation diagram and corresponding Gray Code symbol assignments for an 8-PSK modulation scheme of the present invention.

To decrease the effects of noise on signal to noise ratio, embodiments of the present invention use a D8PSK (Differential 8-state Phase Shift Keying) modulation scheme. Referring to FIG. 10, each of 8 states is shown from 0 degrees through 360 degrees with each state separated by 45 degrees representing 3 bits. This provides 112 bits×=336 bits per message additional to the 112 bits of the original Pulse Position Modulation (PPM) Mode S reply message. Thus, if an additional 3 bit message is sent for each of 6.2 squitters per second, a total of 336 bits per message×6.2 messages=2083 additional bits can be sent via the overlay modulation. Therefore, by modulating each pulse-bit whether in the zero or one position, with D8PSK modulation, a new data link is then created with 3 bits of data for every previous PPM bit. In one embodiment, the new data link would not be detected by existing ATC TCAS and transponder equipment unless it is equipped to detect the D8PSK modulation, ensuring backward compatibility with existing systems.

In various embodiments, states can be encoded to reduce the number of bit errors per symbol. Other schemes using additional parity bits to produce symbols that are completely orthogonal can be used to provide additional interference immunity.

In alternate embodiments, modulation schemes providing more bits per second such as D16PSK (4 bits per message bit) or D32PSK (5 bits per message bit) can be used depending on the amount of noise immunity versus data rate required. Secondary modulation schemes may also be used in conjunction with error correction and control schemes in order to minimize bit error rate and correspondingly increase signal to noise ratios in noisy environments. Also, bits can be encoded into states that only permit one bit change per adjacent state change (Grey Code). This can reduce bit errors to only one bit for changes between adjacent states and helps with noise and interference immunity, as discussed later.

Figure 7:
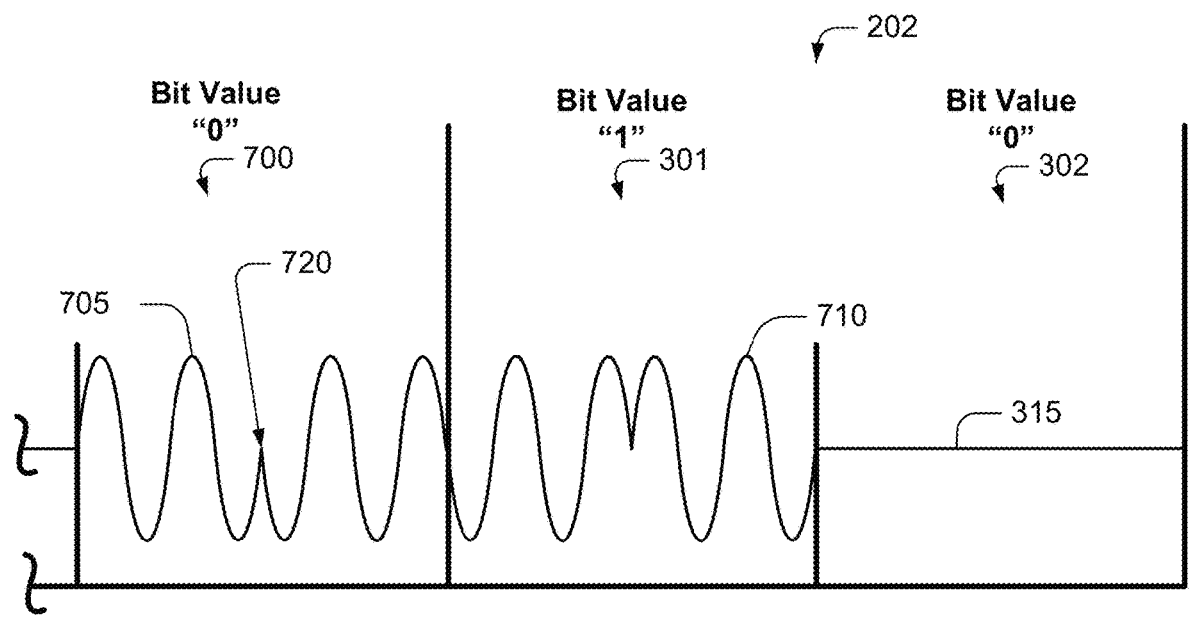
FIG. 7 illustrates one and one half bit intervals, illustrating a merged carrier signal from a bit value of 0 from a previous bit interval, and a bit value of 1 from a following bit interval with midpoint one hundred eighty degree phase shifts.
Figure 8:
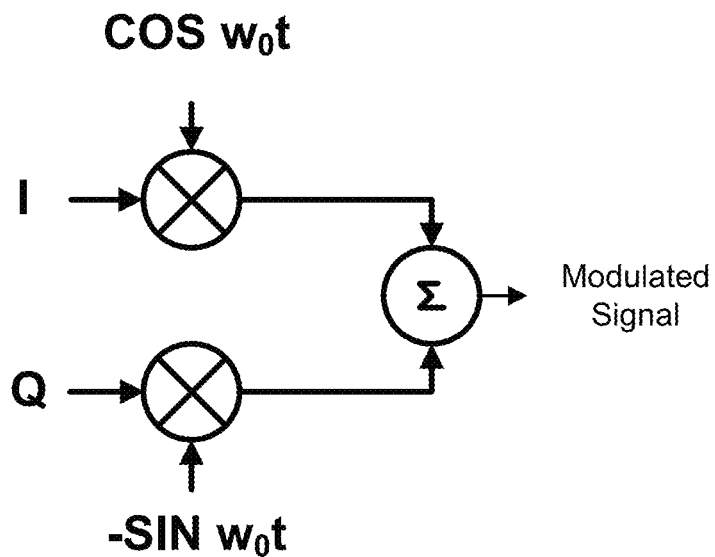
FIG. 8 shows an exemplary modulator of the present invention.
Figure 9:
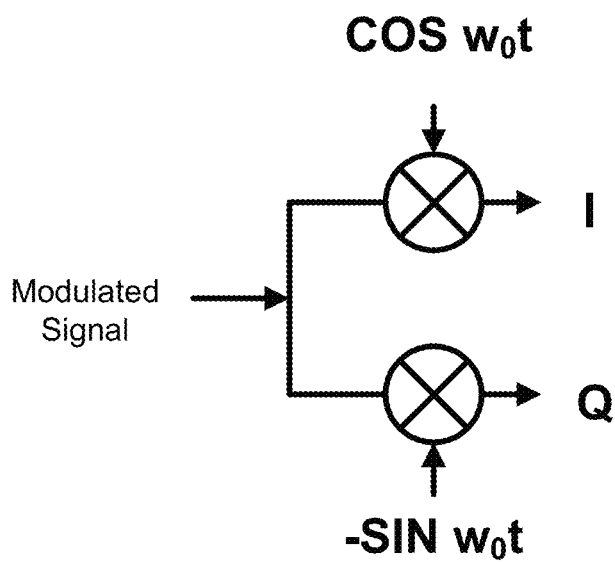
FIG. 9 illustrates an exemplary demodulator of the present invention.

Additional techniques can be used to minimize frequency spectral power effects or bandwidth required to accommodate the additional modulation. For instance, when two pulses are positioned next to one another, such as shown in FIG. 7, and in the case of a sudden change in phase 720 in the first pulse 705 to a different phase in the next pulse 710, an amplitude notch may occur between pulses affecting the bandwidth of the reply. However, if the phase is slowly varied between the middle of the first pulse to the middle of the second pulse, the phase variation occurs over a greater time period and the amplitude notch can be made to be very small, permitting compliance to existing bandwidth requirements for Mode S replies and having no effects upon existing equipment in the field. The phase information can then be read in the beginning of the pulse for the first bit interval (before any phase changes to the next pulse) and near the end of the second pulse for the second bit interval (after a phase change from the first to the second pulse is complete) when two pulses have merged into one, permitting the use of this MSK (Minimum Shift Keying) phase change technique. This approach also can be adapted for significant or multiple intra-sub-interval phase shifts, if embodiments provide for multiple phase shifts per sub-interval.

MSK type of modulation phase change across the pulse will further reduce any spectral effects. The worst case spectral effect is for a phase shift from 0 to 180 degrees, and could be accommodated and tested to ensure compliance with existing industry specifications for a Mode S reply. Spectral and amplitude specifications for Mode S reply emissions can currently be found in RTCA DO-181C.

Additional modulation types with varying degrees of BER, detection gain, and bit throughput can be used. These include, but are not limited to: general phase shift keying modulations; binary phase shift keying modulation (BPSK); quadrature phase shift keying modulation (QPSK); 8-phase shift keying modulation (8-PSK); differential phase-shift keying (DPSK); DNPSK modulation, where N is an even integer and a multiple of 2; frequency shift keying (FSK); amplitude shift keying (ASK); quadrature amplitude modulation (QAM); orthogonal frequency-division multiplexing (OFDM); minimum-shift keying (MSK); asymmetric phase-shift keying, (APSK); pulse position modulation (PPM); amplitude modulation (AM); frequency modulation (FM); or any other modulation form using amplitude, phase, or frequency signal characteristics and methods of use; and combinations of modulation techniques.

In principle, any modulation type can be used. In one embodiment, DO-181C amplitude and spectral requirements are met such that existing ATC equipment is not affected, but new equipment can transmit and detect the overlaying modulation. In addition, some form of bit error detection and correction can be used such as that presented in RTCA DO-181C, Mode S Minimum Operational Performance Specification, and RTCA DO-185A, TCAS Minimum Operational Performance Specification, as an example to improve message reception.

A more suitable means of bit error detection and correction for Phase Shift Keying modulation can, for example, include the use of additional bits to provide orthogonal symbol (cross correlation is zero for one bit errors) encoding with zero correlation between symbol sets (bit patterns between symbols are significantly different by several bit states). For example, the bit values can be represented, as shown below in Table 1 (for two bits to simplify the discussion). Note that this method may require that more bits be used within each symbol to represent the lesser number of bit values (or states), so that a more unique bit pattern is transmitted and received, and can be corrected in the presence of noise or interference with a higher degree of certainty.

TABLE 1

| Bit Values | Symbol Data |
|---|---|
| 00 | 0000 |
| 01 | 0101 |
| 10 | 1100 |
| 11 | 1001 |

Another embodiment of the present invention addresses limiting the effect of burst errors, such as for a single interfering pulse where the "BIT 1" pulse position of the Mode S reply has been overlaid by a stronger in amplitude interfering pulse. This situation could destroy an entire 3 bit symbol for the case of D8PSK (3 bits per symbol). However, if each D8PSK bit value is sent as only one bit of 3 separate messages, then only one bit of each message may be affected, making it possible for 2 of the messages to remain uncorrupted. For example, from Table 1, the last bit of the Symbol Data for Bit Value 10 could be corrupted into a 1, resulting in the sequence from Table 1 to be a 1101 instead of a 1100. Then, the 1101 is incorrect, since it is not a valid symbol and by knowing which bit has been corrupted from the interfering pulse position it is possible to determine that 1100 is the correct symbol for a one bit error, since none of the other symbols are of the form "11XX".

Non-ideal communications channels, noise, attenuation, atmospheric conditions, interference, or other phenomena may induce errors into the message being communicated, whether or not the transmitted message has been overlaid with additional encoded information. In various embodiments of the present invention, conventional error reduction or correction approaches may be applied to reduce bit error rate, such as utilization of a parity overlay or CRC check scheme as described in RTCA/DO-181C, Reed-Solomon bit error detection and correction, or other error conventional detection and correction schemes.

Embodiments of the present invention include the use of a Gray-Code for each phase state transmitted which is most useful for the case where an interfering pulse is near to the same amplitude as the data pulse and cannot be detected, use of a four bit message symbol where only one parity bit is used for every three message bits to detect and correct single bit errors (as opposed to traditional 8 bit symbols where half the bits are parity bits), interleaving of message bit symbols to limit the number of errors per message symbol due to sequential interfering pulses so that most errors can be corrected (after de-interleaving) by changing the state of a single bit, and using a parity overlay encoding scheme on top of the last 24 bits of the address of the intended recipient for point to point messaging or with an all ones address for broadcast messages as is done now for Automatic Dependent Broadcast messages (ADS-B) as described in RTCA DO-260A ADS-B MOPS in conjunction with the error detection and correction algorithm as described in RTCA DO-185A TCAS MOPS. Alternate embodiments provide methods for bit error detection and correction, and may be more efficient in terms of the number of phase message bits that can be corrected per each 112 bit PPM Mode S reply.

Embodiments of the present invention provide new communication protocols and waveforms that are not recognized by existing ATC equipment, yet work to provide enhanced data link performance within acceptable format and spectrum guidelines thereby minimizing or negating impact on existing equipment and infrastructure. Such signals may be used with any modulation type using frequency, phase, amplitude and their derivative techniques such as spreading functions or digital communications modulation such as 8PSK.

Figure 11:
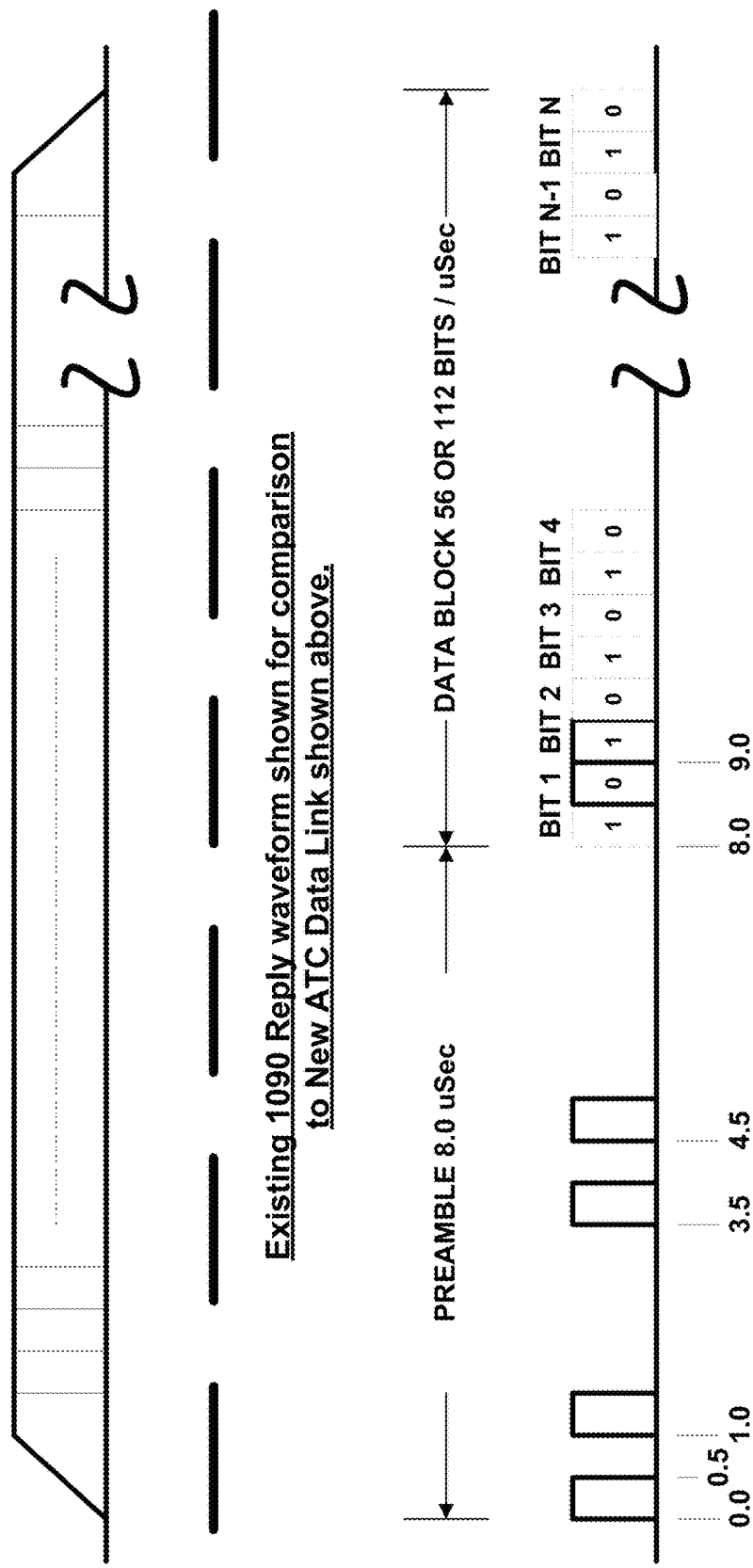
FIG. 11 illustrates one embodiment of an advanced ATC data link waveform compared to a legacy ATC waveform.

Methods for creating embodiments of advanced ATC data links may include providing signals that may purposely not conform to allowed standards in certain performance categories, and thereby, such signals may be rejected by legacy hardware and infrastructure equipment while being accepted by equipment with enhanced capabilities to accept such signals. This permits the use of existing equipment within the ATC environment, and the use of new equipment that can be either backwards compatible or independent of existing ATC data formats, permitting more data throughput efficiency using the same ATC bandwidth and frequency assignments of 1030 and 1090 Mhz. For example, but not by way of limitation, an amplitude waveform with rise and fall times greater than those permitted for detection by existing equipment could be utilized (see FIG. 11).

In one embodiment, a modulated waveform comprising an adjustable rise and fall time. In another exemplary embodiment, a modulated waveform comprising a rise time and fall time less than, greater than or equal to 600 nsec. Rise time (also risetime) refers to the time required for a signal to change from a specified low value to a specified high value. Typically, these values are 10% and 90% of the step height. The output signal of a system is characterized also by fall time. Also, the pulse width may be selected to be accommodated by existing TCAS or Mode S equipment. This waveform may then be modulated with any desired format or protocol, such as an n-ary phase shift key approach, such as 8-PSK. Preamble data can be designed to include a set of initial 8-PSK data bits that are sent in a particular pattern (such as 10 bits with a value of zero).

Figure 12:
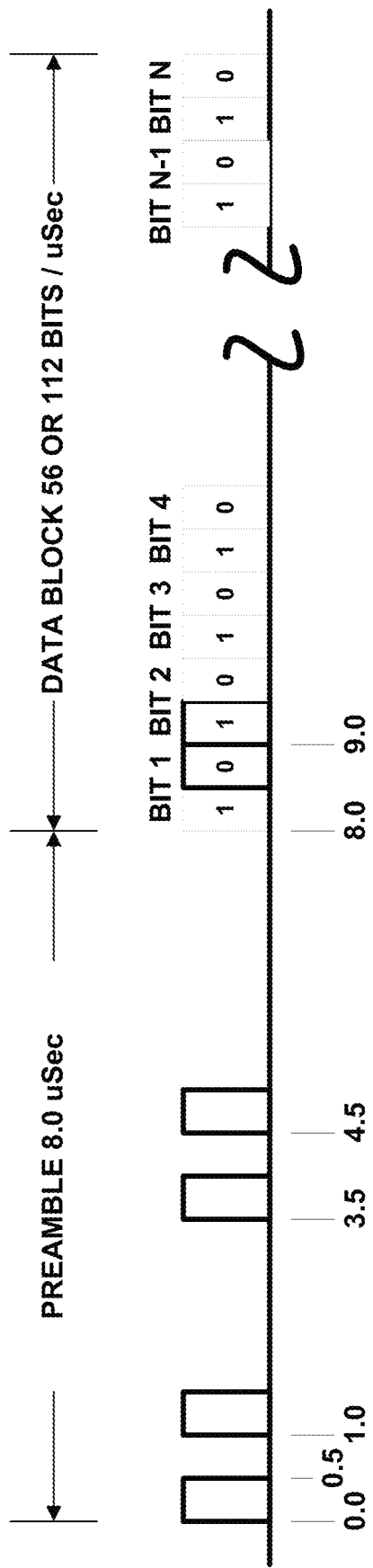
FIG. 12 illustrates one embodiment of BIT position according to legacy ATC PPM waveforms.

Embodiments of the present invention offer enhanced flexibility in terms of the number of bits per message and are not constrained by legacy waveform implementations. Embodiments of the present invention also offer improved modulation dwell time per symbol. This is because, in part, existing ATC PPM waveforms are constrained to 0.5 usec per bit and can merge two bits into one 1.0 usec bit restricting 180 degree phase reversal transition rates due to bandwidth constraints (See FIG. 12). Thus various waveforms in embodiments of the present invention provide consistent spacing between data bits to permit entire bit dwell time to be at the desired modulation phase without any restrictions on phase transition rate during symbol dwell time. This may result in better noise immunity during reception. In an alternative embodiment a waveform comprising n usec per bit may be utilized where n is any desirable value regardless of legacy constraints.

Since existing and legacy PPM waveforms tend to be centered at 1090 or 1030 MHz, in various embodiments of the present invention new waveforms could be offset near frequency tolerance edges providing some additional interference immunity from existing waveforms. Likewise, in various embodiments, amplitude can be varied based on range to intended recipient or other interference limiting criteria to reduce interference in the environment.

In various embodiments, the type of modulation used with the advanced ATC data link may include any modulation type that does not interfere with existing equipment. For example, but not be way of limitation, embodiments of the present invention may include waveforms utilizing amplitude pulse modulation, where the pulses sent all have rise and fall times greater, less than or equal to 600 nsec, NPSK, Frequency Shift Keying, or any other modulation using frequency, amplitude, or phase and their derivative techniques such as Walsh spreading functions.

Additionally, other embodiments of the invention may implement pulse width which can be accommodated by existing TCAS or Mode S equipment. This waveform may be modulated with NPSK (8PSK for example). In one embodiment, preamble data can be a set of initial 8PSK data bits that are sent in a particular pattern (such as 10 bits with a value of zero). Other embodiments of the invention have flexibility in terms of number of bits per message, modulation dwell time per symbol. Also, it is not constrained by legacy waveform implementations.

As noted previously, the present invention may utilize any system or method disclosed herein, or in any related application, to increase data throughput. Such increased data throughput may be employed in any one of a number of different ways to improve aircraft operability and safety, such as providing data concerning weather conditions, as well as to provide supplemental services to aircraft passengers. Such supplemental services may, for example, include providing access to: (1) a network, such as the Internet, (2) a communication system, such as a telephonic communication system, a text-based communication system or a video-based communication system, (3) entertainment content, such as music, a movie, a game or any other entertainment content whether such content be provided in an audio format, a visual format or a combination thereof and (4) an offer to sell a product or a service.

Figure 13A:
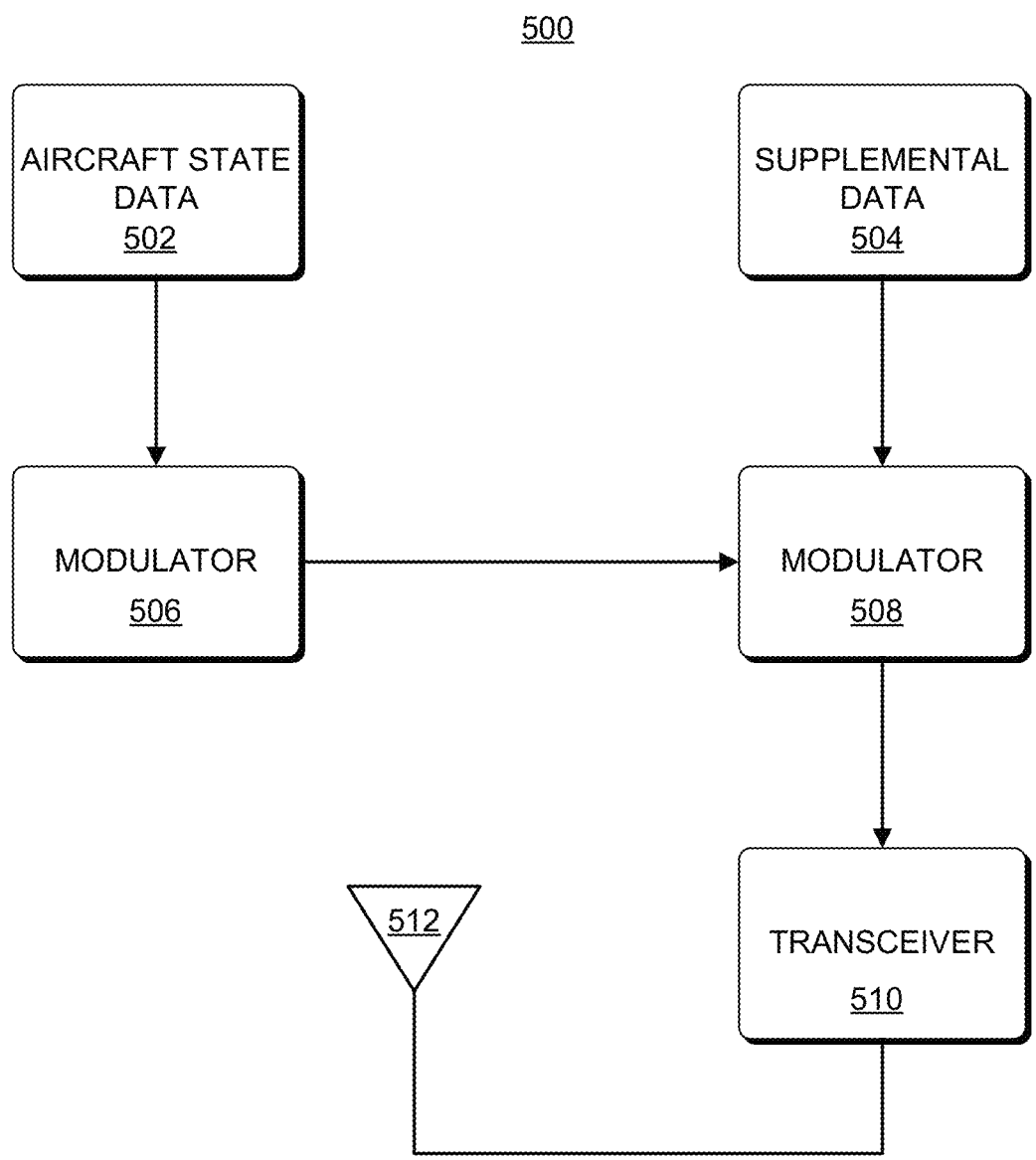
FIGS. 13A and 13B depict block diagrams of exemplary systems that may be utilized with the present invention.
Figure 13B:
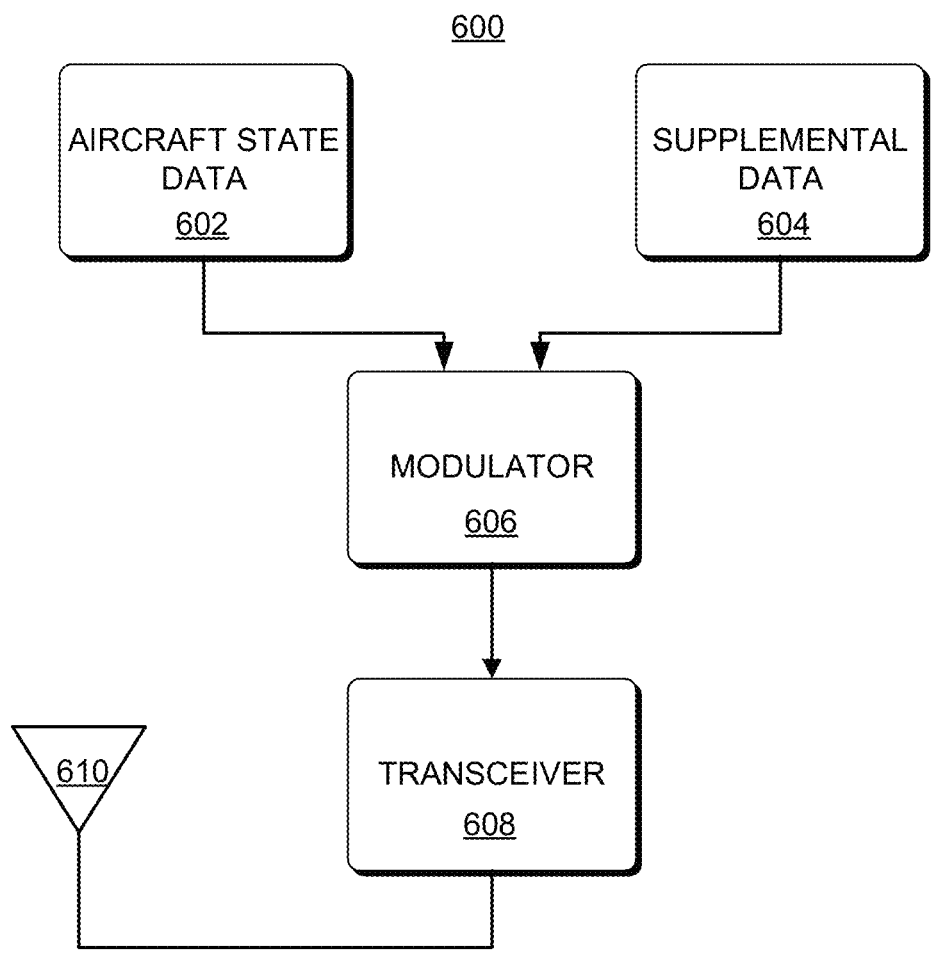

FIGS. 13A and 13B depict block diagrams of exemplary systems 500 and 600, respectively, that may be utilized with the present invention, noting again, however, that the present invention may utilize any system or method disclosed herein, or in any related application, to increase data throughput.

Referring to FIG. 13A, system 500 may include stored or received aircraft state data 502, stored or received supplemental data 504, a modulator 506, a modulator 508, a transceiver 510 and one or more antennas 512. The data referenced by aircraft state data 502 and the supplemental data 504 may be stored in memory or received and used directly or stored for later use.

Aircraft state data may be defined to mean any data defining any state for any aircraft. For example, the state may comprise one or more of a position, a velocity, an acceleration, a heading, an altitude and an aircraft identifier for any aircraft, as well as a position, a condition and a status of any part of any aircraft. In an exemplary embodiment, the aircraft state data comprises ADS-B surveillance data.

The information other than aircraft state data, such as supplemental data 504, may comprise one or more of data about an environment external to any aircraft and data for use in providing a service to an occupant of any aircraft. The data about the environment external to any aircraft may comprise data about a weather condition in proximity to any aircraft, as well as data about a weather condition that is not in proximity to any aircraft.

The data for use in providing a service to an occupant of any aircraft may comprise one or more of providing access to a network, providing entertainment, providing communication, providing an offer to sell a product or a service and providing an advertisement. Providing access to a network may comprise providing access to the Internet. The service of providing entertainment may comprise providing music, a movie, a game or any other entertainment content in any format including audio, visual or a combination thereof. The service of providing communication may comprise providing access to one or more of a telephonic communication system, a text-based communication system and a video-based communication system.

Modulator 506 modulates aircraft state data 502 into a signal for transmission, while modulator 508 modulates the supplemental data 504 into the same signal, overlaying both data sources into the same signal for transmission by transceiver 510 and antenna 512.

Referring to FIG. 13B, system 600 may include stored or received aircraft state data 602, stored or received supplemental data 604, a modulator 606, a transceiver 608 and one or more antennas 610. The data referenced by aircraft state data 602 and the supplemental data 604 may be stored in memory or received and used directly or stored for later use. Aircraft state data 602 and the supplemental data 604 may be defined the same as described above with reference to aircraft state data 502 and the supplemental data 504 in FIG. 13A. Modulator 606 modulates the aircraft state data 602 and the supplemental data 604 into the same signal, over-laying both data sources into the same signal for transmission by transceiver 608 and antenna 610.

Figure 14:
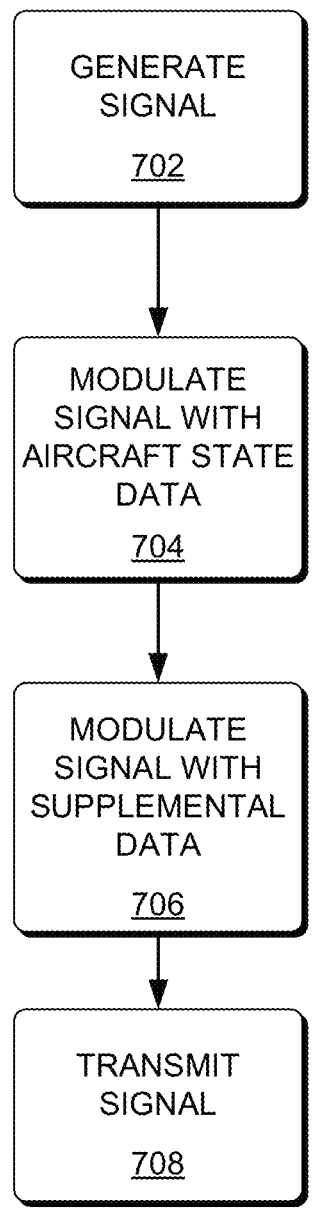
FIG. 14 depicts a block diagram of an exemplary method that may be utilized with the present invention.

FIG. 14 depicts a block diagram of an exemplary method 700 that may be utilized with the present invention, noting again, however, that the present invention may utilize any system or method disclosed herein, or in any related application, to increase data throughput. Referring to FIG. 14, the exemplary method (700) generates (702) a signal for transmission from a first transceiver to a second provided transceiver; modulates (704) the signal with a first data pattern, the first data pattern comprising aircraft state data; modulates (706) the signal with a second data pattern, the second data pattern comprising information other than aircraft state data; and transmits (708) the signal including both the first data pattern and the second data pattern from the first transceiver to the second provided transceiver.

Figure 15:
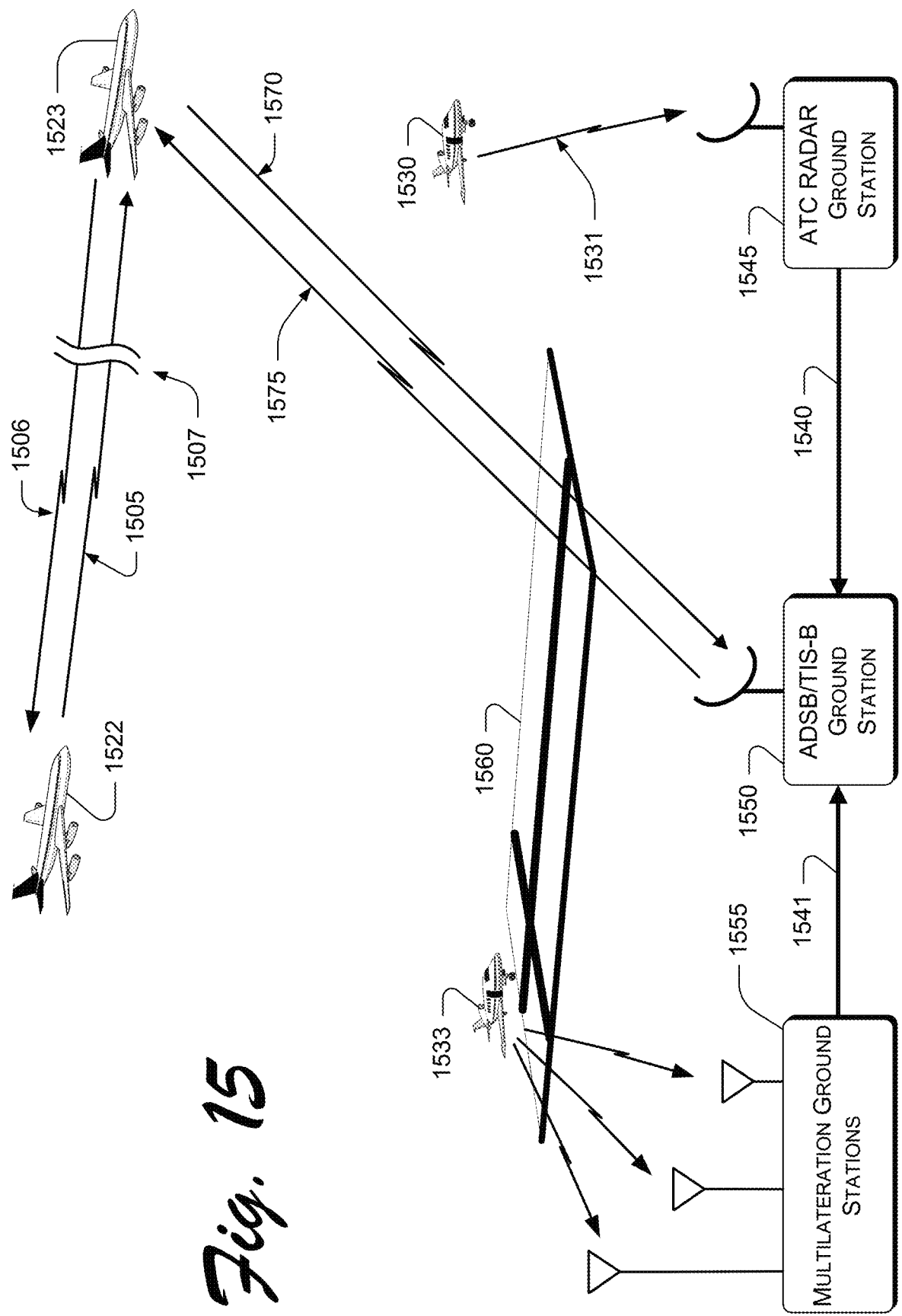
FIG. 15 shows a depiction of an exemplary system of the present invention implemented in an aviation context.

Turning to FIG. 15, in one embodiment of the present invention, aircraft 1522, 1523 are equipped with legacy avionics as well as features of the present invention providing for an alternative data link nondestructively overlaid on ATC signals (such as ADS-B or TIS-B signals) that are received or broadcast by the aircraft 1522, 1523 (as used herein, such aircraft are also referred to as "equipped aircraft"). In embodiments of the present invention, ground stations 1550 are equipped not only to broadcast or receive ATC signals but to send and receive additional data such as meteorological information that is nondestructively overlaid upon the ATC signals. Such overlaid signals still maintain compliance with applicable ATC-related standards while containing additional information modulated and/or encoded within the transmitted signal (thereby making more efficient use of available spectrum). Approaches to data overlay, and methods and systems of providing an overlay data link through encoding and modulation techniques are discussed in U.S. utility patent application Ser. Nos. 12/105,248 filed Apr. 17, 2008; 12/467,997 filed May 18, 2009; and 12/482,431 filed Jun. 10, 2009, the disclosures of which are fully incorporated by reference herein for all purposes.

The equipped aircraft 1523 transmits its state data through signals 1506, 1570, in a format such as a 1090 MHz ADS-B transmission, and the signals 1506, 1570 are simultaneously and nondestructively overlaid with additional information that may comprise data other than aircraft state data. For example, the aircraft 1523 could through overlay approaches transmit through the ATC signal a secondary data pattern that relates to weather conditions (such as turbulence proximate to the aircraft 1523). The aircraft 1522 and ground station 1550, respectively receive signals 1506, 1570, and decode the overlaid signals to produce the original ATC-related aircraft state data as well as the secondary data pattern overlaid on the signals 1506, 1570. Likewise, the aircraft 1523 may receive transmitted overlaid signals 1505, 1575, that may comprise ADS-B or TIS-B-compatible signals that are nondestructively overlaid with additional data, and in one embodiment, the additional data is non-aircraft state related (that is, not restricted to information about an aircraft).

In another aspect of the invention, aircraft 1533, 1530, that are not equipped with certain avionics systems such as ADS-B, can still be tracked by equipped aircraft 1523. In one embodiment, multilateration ground stations 1533 determine an enhanced accuracy position of aircraft 1533 that is shown in proximity to runway 1560, and relay the position information about aircraft 1533 through a ground network 1541 (which may be implemented in any conventional wired, optical or wireless technique) to a ground station 1550. The ground station 1550 then nondestructively overlays a signal, such as TIS-B signal 1575, with additional information about the location of the non-equipped aircraft 1533. Equipped aircraft 1523 can then demodulate and/or decode the overlaid signal 1575 to obtain position information aircraft 1533, and in one embodiment, systems of the ground station 1550 determine modifications to the flight plan of equipped aircraft 1523, and relay the flight plan modifications to the equipped aircraft 1523 through the overlaid TIS-B signal 1575. A similar embodiment of the present invention allows information regarding a aircraft 1530 that is equipped with a transponder but not ADS-B avionics to be obtained by a radar ground station 1545, sent through a network 1540 to a ground station 1550, overlaid onto an ADS-B or TIS-B signal, and then transmitted to an equipped aircraft 1523. Systems of the ground station 1550 may process the information regarding the aircraft 1530 and calculate modifications to the flight plan of any aircraft as a result, and may overlay the modified flight plan information on signals 1575 that are transmitted to aircraft 1523.

Systems and methods of the present invention allow equipped aircraft to process information overlaid on ATC signals and act as routers, relays, or repeaters of the information, and therefore equipped aircraft (and or equipped ground stations) become nodes in a virtual communication network that uses data links formed through overlays to transmit and receive information. Any number of intermediary equipped aircraft or ground stations may act as relays or repeaters between a source and destination of overlaid data, which is indicated in FIG. 15 by cut lines 1507. Further, conventional techniques that create and administer ad-hoc network configurations may be applied to equipped aircraft/ground stations to form a dynamic network configuration using the overlay data links of the ATC signals transmitted between network nodes. In one embodiment, information regarding non-equipped aircraft 1533 or 1530 may be transmitted by equipped ground station 1550 through an overlay on signal 1575, routed through equipped aircraft 1523, and forwarded by overlaying the data and transmitting through the signal 1506 to equipped aircraft 1522, which may be an intended destination for the overlaid information. This embodiment may used, for instance, as an alternative communications path, or when equipped aircraft such as aircraft 1522 is out of range of a particular transmitter or receiver.

Figure 16:
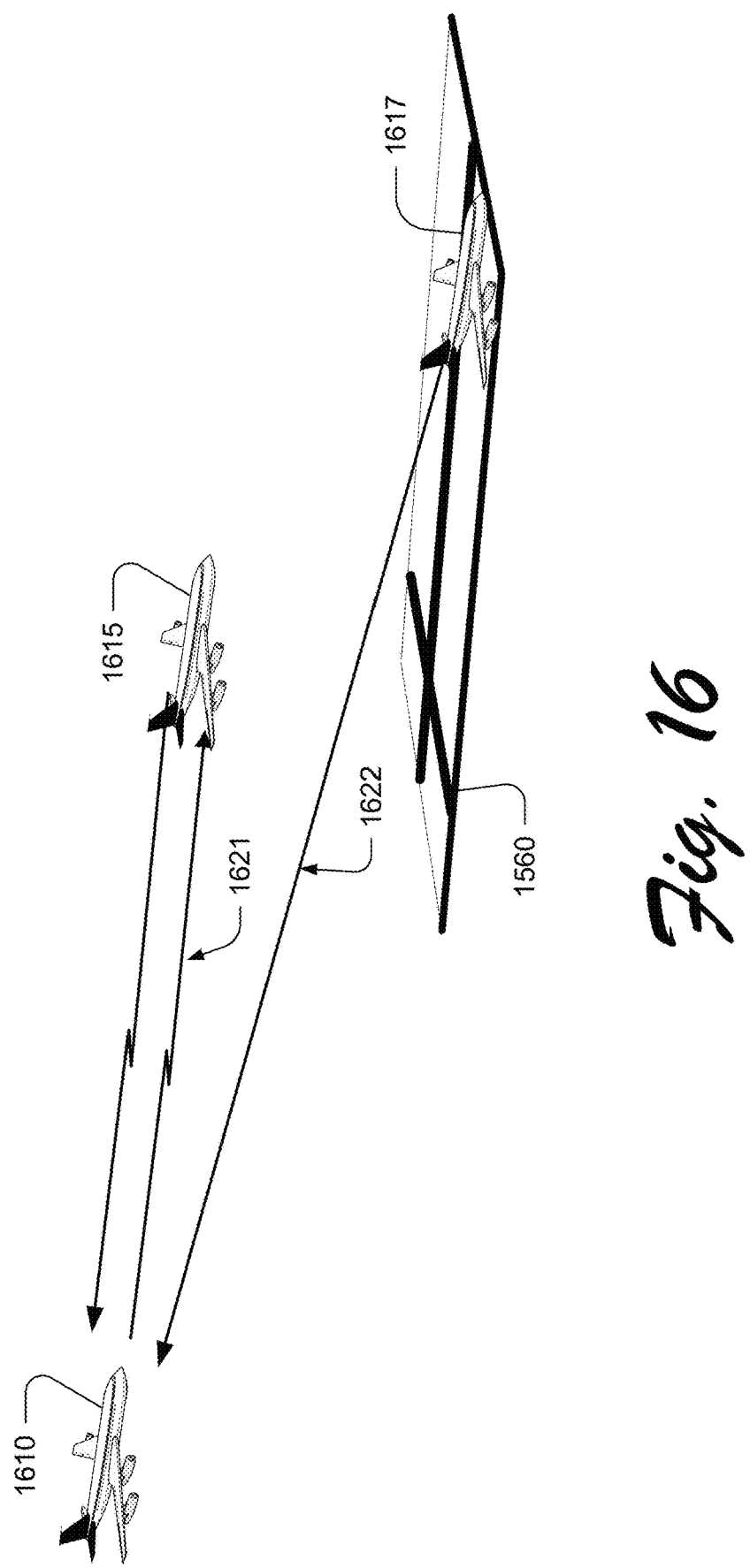
FIG. 16 illustrates aviation-related embodiments of a system of the present invention.

FIG. 16 shows implementations of systems of the present invention regarding transmission and processing of data overlaid on ATC signals. In one aspect, some aircraft state data can be transmitted and used in a validation capacity to ensure that data source integrity and accuracy is met. For example, equipped aircraft 1615 could validate its above field altitude by comparing its barometric altitude to the barometric altitude of an equipped aircraft 1617 that is at a known altitude (in this case, on the ground). Data regarding the on-ground barometric altitude is transmitted from equipped aircraft 1617 through an overlay on an ATC signal 1622, and forwarded by equipped aircraft 1610, through an overlay on an ATC signal 1621 to the aircraft 1615. The equipped aircraft 1615 may then extract the on-ground barometric altitude data from the overlaid signal 1621 and verify its distance above the field (e.g. from a radar altimetry measurement) by subtracting the on-ground barometric altitude of aircraft 1617 from its own current barometric altitude.

In another implementation of the present invention, distance between aircraft may be validated, and the more accurate information may be used to manage turbulence and wake vortex atmospheric differences. ADS-B primarily makes use of GPS position and velocity data which can be validated by a TCAS system using secondary surveillance (i.e., using transponder replies from the other aircraft) with radar ranging measurements and derived velocity data. Derived velocity data can be obtained from standard traffic tracking techniques such as with alpha-beta trackers. ADS-B GPS Geo altitude data can also be validated by use of barometric data readily available from the air data computer in most commercial aircraft.

Embodiments of the present invention use meteorological and aircraft state data not only in ground station planning purposes, but also between aircraft in flight. For example, equipped aircraft may use data transmitted on overlay links to provide notice of severe turbulence areas, allowing sufficient warning times to prevent injuries to passengers. Airborne weather radars today often provide turbulence data warnings with insufficient warning time, or not at all due to clear air turbulence where it is difficult for weather radars that currently use radar reflections from airborne moisture to provide turbulence detection. So for example, if an equipped aircraft flying in front of a second equipped aircraft encounters turbulence as much as 80 nautical miles away, the second aircraft can decide based on validated range data (ADS-B position validated with TCAS range data) to avoid that area by changing its altitude or horizontal flight path until the first aircraft indicates by overlaid data that the weather is all clear. This overlaid data could also be networked through overlay data links by forwarding it from the first aircraft to one or more trailing equipped aircraft for a period of time to warn other aircraft about the turbulence. As mentioned before, the networking can be implemented using ground based ADS-B 1090 MHz ground stations or between aircraft.

In various embodiments, ground networking of aircraft meteorological data can also be accessed before takeoff so that 4-D (position and time) flight path planning can be accomplished to the destination airport. In embodiments of the present invention, meteorological data is transmitted by aircraft to ground stations through overlay data links to enable more accurate weather prediction models to be utilized on the ground. Better planning due to more accurate 4-D flight paths and arrival times and more accurate weather prediction permits a highly accurate planning of traffic landing "slots" (position at a specific time) of aircraft into an airport that enables very efficient throughput of aircraft traffic.

Conventional systems access databases and make certain assumptions to attempt to determine when wake turbulence may be encountered. For example, some systems assume certain state data of a leading aircraft (such as flap position) by using a database and navigation position information to determine when the leading aircraft is in proximity to an airport and at a low enough altitude to have deployed flaps. Embodiments of the present invention improve these systems by transmitting on an overlay data link actual aircraft state data such as flap settings, gear up or down settings, and meteorological data between aircraft so that aircraft configurations are more accurately known. For example, this transmitted data can then be validated by use of additional information such as airport field altitude.

Referring to FIG. 16, onboard altimetry data providing distance Above Ground Level (AGL) can be used to determine airport 1560 field altitude eliminating the need for an airport database. This determination can be accomplished by using secondary surveillance to determine when aircraft have landed; in one embodiment this is accomplished by receiving, through data overlaid on an ATC signal 1622 a report of aircraft Landing Gear On-Ground switch, radar altimetry data that indicates AGL is at or near zero, and the barometric and GEO altitude the aircraft 1617 is reporting on the ground. An equipped aircraft 1610 can then use the received barometric altitude of the airport field 1560 to determine if an aircraft flying in front 1615 has the potential to create a significant wake vortex. Thus the airport field altitude information can be obtained without the use of an airport data base to confirm that the leading aircraft 1615 has flap settings for landing and may cause wake vortex problems.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of relaying information between a first transceiver disposed within an equipped on-ground aircraft at an airport field and a second provided transceiver disposed within an equipped trailing aircraft, the method comprising:
    obtaining an altitude of the airport field by receiving altitude information from the equipped on-ground aircraft that is located at the airport field, the received altitude information serving as a proxy for the altitude of the airport field without the use of an airport location database;
    generating a signal for transmission from the first transceiver to the second provided transceiver;
    initially modulating the signal with a first data pattern by a first modulator, the first data pattern comprising aircraft state data, the aircraft state data including Automatic Dependent Surveillance Broadcast (ADS-B) surveillance data;
    modulating the initially modulated signal with a second data pattern by a second modulator to form a twice modulated signal, the second data pattern comprising the altitude of the on-ground aircraft; transmitting the twice modulated signal including both the first data pattern and the second data pattern from the first transceiver to the second provided transceiver;
    receiving, by the equipped trailing aircraft, navigation position information of a leading aircraft;
    receiving, by the equipped trailing aircraft, flap settings data transmitted from the leading aircraft; and
    determining, by the equipped trailing aircraft that the leading aircraft may create a wake vortex that interferes with the trailing aircraft by confirming, from the received altitude information and the received navigation position information of the leading aircraft that the leading aircraft has flap settings for landing and may cause wake vortex problems.

2. The method of claim 1 wherein the signal is modulated to include the first data pattern with a pulse position modulation protocol.

3. The method of claim 1 wherein the signal is modulated to include the second data pattern with a phase shift keying modulation protocol.

4. The method of claim 1 wherein the signal is modulated to include the second data pattern with a modulation protocol selected from the group consisting of:
    binary phase shift keying modulation (BPSK);
    quadrature phase shift keying modulation (QPSK);
    8-phase shift keying modulation (8-PSK);
    differential phase-shift keying (DPSK);
    DNPSK modulation, where N is an even integer and a multiple of 2;
    frequency shift keying (FSK);
    amplitude shift keying (ASK);
    quadrature amplitude modulation (QAM);
    orthogonal frequency-division multiplexing (OFDM);
    minimum-shift keying (MSK);
    asymmetric phase-shift keying, (APSK);
    pulse position modulation (PPM);
    amplitude modulation (AM);
    frequency modulation (FM); and
    combinations thereof.

5. The method of claim 1 wherein the signal is modulated to include the first data pattern resulting in a transformation of the signal to one selected from the group consisting of:
    a transponder reply signal;
    a squitter signal;
    an ADS-B reply signal;
    a 1030 MHz interrogation signal;
    a 1030 MHz TCAS signal; by
    a General Aviation UAT transceiver signal on a UHF frequency band;
    at least one of a signal within a voice band or a data band operating within an ATC HF, VHF, and UHF band,
    a VDL Mode 4 ADS-B modulated signal;
    a DME signal;
    SATCOM signal;
    a signal originating from any avionics equipment that radiates a modulated RF signal;
    a baseband signal for transmitting data; and
    combinations thereof.

6. The method of claim 1 further comprising:
    verifying a distance above the airport field by subtracting an on-ground barometric altitude of the on-ground aircraft from a current barometric altitude of the leading aircraft.

* * * * *